United States Patent
Vahedi et al.

(10) Patent No.: US 11,831,235 B1
(45) Date of Patent: Nov. 28, 2023

(54) MULTI-LEVEL POWER CONVERTER WITH SOFTWARE CONTROL OF SWITCHES AND DEADTIME

(71) Applicant: dcbel Inc., Montréal (CA)

(72) Inventors: Hani Vahedi, Brossard (CA); Peter Ibrahim, Westmount (CA); Marc-André Forget, Saint-Lazare (CA)

(*) Notice: Subject to any disclaimer, the term of this patent is extended or adjusted under 35 U.S.C. 154(b) by 0 days.

(21) Appl. No.: 18/315,259

(22) Filed: May 10, 2023

Related U.S. Application Data

(60) Provisional application No. 63/401,409, filed on Aug. 26, 2022.

(51) Int. Cl.
*H02M 1/38* (2007.01)

(52) U.S. Cl.
CPC .................... *H02M 1/385* (2021.05)

(58) Field of Classification Search
CPC .................. H02M 3/38; H02M 1/385
See application file for complete search history.

(56) References Cited

U.S. PATENT DOCUMENTS

| | | |
|---|---|---|
| 5,872,710 A | 2/1999 | Kameyama |
| 6,798,161 B2 | 9/2004 | Suzuki |
| 6,914,399 B2 | 7/2005 | Kushion et al. |
| 6,956,361 B1 | 10/2005 | Mozipo et al. |
| 7,057,910 B2 | 6/2006 | Takahashi et al. |
| 7,098,640 B2 | 8/2006 | Brown |
| 7,589,506 B2 * | 9/2009 | Brown ................ H02M 3/1588 323/282 |
| 7,800,350 B2 | 9/2010 | Pigott |
| 8,395,362 B2 | 3/2013 | Brown et al. |
| 8,810,177 B2 | 8/2014 | Schulz |
| 9,294,001 B2 | 3/2016 | Kimura et al. |
| 9,847,721 B2 | 12/2017 | Kim |
| 9,906,167 B2 | 2/2018 | Degner et al. |
| 11,594,953 B1 * | 2/2023 | Ramirez Sanchez ..... H02J 3/32 |
| 2005/0184716 A1 | 8/2005 | Schulz |
| 2016/0013720 A1 * | 1/2016 | Yamada ................ H02M 3/156 323/271 |

FOREIGN PATENT DOCUMENTS

| | | |
|---|---|---|
| JP | 2011223065 A | 11/2011 |
| WO | 2019/071359 A1 | 4/2019 |

* cited by examiner

*Primary Examiner* — Adolf D Berhane

(57) ABSTRACT

A system for optimizing dead time of switches, for example in power converters, using software. The system is first calibrated. The system determines the state that switches should be in. If the switch state needs to be changed, the system determines an optimized dead time which needs to be waited between turning one switch off and a complimentary switch on. The system controls the switches to turn on or off switches and waiting only the duration of the optimized dead time.

20 Claims, 11 Drawing Sheets

| Index | LF1 | LF2 | HF1 | HF2 | ... | switch n |
|---|---|---|---|---|---|---|
| 0 | 0 | 1 | 0 | 1 | ... | 0 |
| 1 | 0 | 1 | 1 | 0 | ... | 0 |
| 2 | 0 | 1 | 0 | 1 | ... | 1 |
| ... | ... | ... | ... | ... | ... | ... |
| 166 | 1 | 0 | 1 | 0 | ... | 1 |
| 167 | 1 | 0 | 0 | 1 | ... | 1 |

| Switch Age | Temperature (C) | ... | Dead time (s) |
|---|---|---|---|
| X cycles | 15 | ... | x1 |
| X cycles | ... | ... | ... |
| X cycles | 20 | ... | xn |
| Y cycles | 15 | ... | y1 |
| Y cycles | ... | ... | ... |
| Y cycles | 20 | ... | yn |
| Z cycles | 15 | ... | z1 |
| ... | ... | ... | ... |

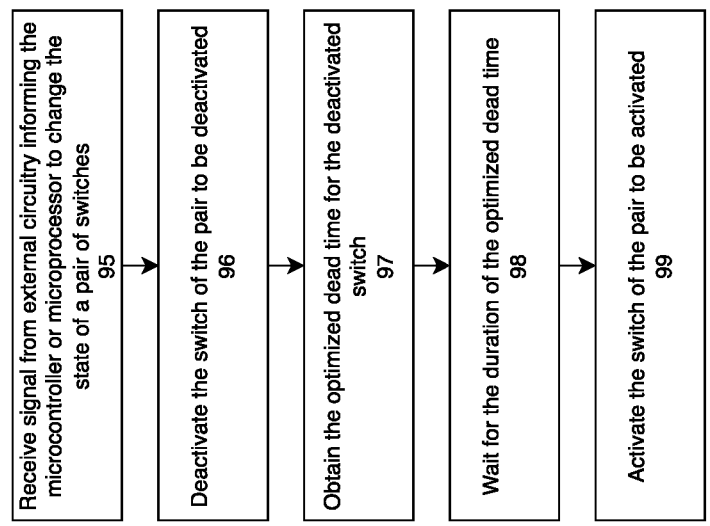

MULTI-LEVEL POWER CONVERTER WITH SOFTWARE CONTROL OF SWITCHES AND DEADTIME

CROSS-REFERENCE TO RELATED APPLICATIONS

This application claims priority from U.S. provisional patent application 63/401,409 filed Aug. 26, 2022, the specification of which is hereby incorporated by reference.

TECHNICAL FIELD

This patent application relates to the field of power converters such as rectifiers and inverters operating, for example, at residential voltage and power. This application also relates to pairs of alternating switches.

BACKGROUND

Power converters use pairs of switches in various configurations to perform their function. Sometimes, only one of these pairs of switches can be on (i.e., allowing current to pass) at one given time, or the system will undergo a short circuit. If one wishes to alternate which of the pair of switches is on, one needs to turn off the switch that is on, allow a small delay of time to pass (dead time) as residual energy in the system is dissipated, and then turn on the other switch. The dead time is undesirable, as the system is not functioning during dead time, but it is necessary because the residual energy left by a recently closed switch is capable of creating a short circuit when the other switch is connected.

Pairs of switches in power converters may alternate rapidly (hundreds or thousands of times per second) between their on/off phases. One alternation involves turning off the first switch of a pair of switches, waiting for residual energy to dissipate (dead time), then turning on the second switch of the pair of switches. A dead time is necessary for each alternation. Even if the dead time is relatively small, the high rate of alternation will cause the system to wait the duration of that dead time very frequently.

Often, systems will use dead times that are longer than necessary, because calculating exactly how long a dead time should be is complex and based on many variables as described in the following paragraphs. There is an overall need to reduce dead time as much as possible to increase the efficiency of the system.

One difficulty in managing dead time is that there is a different dead time for each type of switch. Various systems, such as five-level packed U-cell (PUC5) power converters, have different types of switches within one system with their own properties (e.g., low frequency and high frequency switches). Some types of switches will require longer or shorter dead times, per their fabrication. Using one dead time for all switches will lead to a loss of efficiency or risk of short circuit.

Another difficulty in managing dead time is that the dead time for each type of switch changes throughout the lifetime of a switch. Usually, this means that an older switch will require a longer dead time than a newer switch of the same type. Using one dead time throughout the lifetime of the switch will lead to a loss of efficiency or risk of short circuit.

Another difficulty in managing dead time is that the dead time for each switch is dependent on some system parameters, such as the temperature during operation. A higher temperature will require a longer dead time than a lower temperature. Using one dead time throughout the operation of the switch will lead to a loss of efficiency or risk of short circuit.

Altogether, there is a need for a system that can take into account the various variables at play that affect switch dead time and can manage, for the purposes of minimizing, the dead time of various switches in a system accordingly.

SUMMARY OF THE INVENTION

The present disclosure relates to systems and methods for automatically regulating the dead time of various pairs of switches via software to minimize dead time, maximizing the efficiency of the system. Overall, the current disclosure may be configured to have a microcontroller or microprocessor which receives information from a variety of sources about what state the switches should be in for power conversion. When the state of a switch pair is to be changed, the microcontroller or microprocessor may turn off the switch to be deactivated, wait the minimum amount of time for residual energy in the system to be dispersed (in other words, wait the optimized dead time), and turn on the switch to be activated.

A broad aspect of the present disclosure is to provide a system for optimizing the dead time of various pairs of switches in a power converter, the system including a memory and a microcontroller or microprocessor, connected to said memory and to at least one switch pair, said microcontroller or microprocessor for executing a program stored in said memory to: determine ideal states for at least one switch pair, turn off ones of said at least one switch pair to be deactivated, determine an optimized dead time of one or more switches to be activated and turn on ones of said at least one switch pair to be activated after the optimized dead time has passed.

In some embodiments, the system may further include one or more dead time tables stored in said memory, wherein said dead time tables contain an optimized dead time column and one or more parameter columns. In some embodiments, the microcontroller or microprocessor may further be configured to access said dead time tables during step (iii) and use one or more parameters to read in the table the optimized dead time of one or more switches to determine an optimized dead time. In some embodiments, said parameters may include the switch type or make, the temperature of the switch determined by one or more temperature sensors connected to the microcontroller or microprocessor, the age of the switch and the status of the switch, determined by evaluating the status of switches during a calibration step.

In some embodiments, the microcontroller or microprocessor may determine the optimized dead time of one or more switches by performing a calculation using parameters about the switches. In some embodiments, said parameters may include the switch type or make, the temperature of the sensor determined by one or more temperature sensors connected to the microcontroller or microprocessor, the age of the switch and the status of the switch, determined by evaluating the status of switches during a calibration step. In some embodiments, the calculated optimized dead time may be stored in said memory so that the optimized dead time calculation need not be performed every switch alternation.

In some embodiments, the system may further include external circuitry capable of determining the ideal states of switches. In some embodiments, determining the ideal states for at least one switch pair may involve receiving a signal from the external circuitry informing the microcontroller or microprocessor of the state that the at least one pair of switches should be in.

In some embodiments, the system may further include one or more switch sequence tables stored in said memory, wherein said one or more switch sequence tables contain an index column and one or more ideal switch state columns. In some embodiments, the program executed by the microcontroller or microprocessor may be further configured to receive information from one or more voltage sensors about an alternating current connected to the power converter, use said information to determine the phase of said alternating current and determine a current index value reflective of said phase. In some embodiments, determining the ideal states for at least one switch pair may involve accessing said switch sequence tables during step, using the current index value to read in the table the ideal states for one or more switches and updating the current index after a predetermined amount of time has passed.

In some embodiments, the microcontroller or microprocessor may determine the ideal state of switches of one or more switches by performing a calculation. In some embodiments, said calculation may involve receiving information from one or more voltage sensors about an alternating current connected to the power converter, using said information to determine the phase of said alternating current, and determining what the ideal state of each switch pair should be depending on said phase. In some embodiments, the calculated ideal switch states may be stored in said memory so that the optimized dead time calculation need not be performed every cycle of current.

In some embodiments, the program executed by the microcontroller or microprocessor may be further configured to repeat the program. In some embodiments, the microcontroller or microprocessor may be connected to at least one high frequency switch pair and at least one low frequency switch pairs. In some embodiments, the activation and deactivation of switches may be accomplished indirectly by sending the microcontroller or microprocessor output signal to an intermediary circuit.

Another broad aspect of the present disclosure is to provide a multi-level power converter including, an AC port, a DC port, a multi-level power converter circuit connected to said AC port and said DC port having a plurality of oppositely gated pairs of power switches including low frequency switches and high frequency switches, a switch controller of the type having digital logic or a processor responsive to a reference signal that generates gate signals for said low frequency switches and for said high frequency switches, wherein said switch controller is responsive to stored values defining a deadtime in said pairs of switches during which one of said pairs of switches has time to transition from conducting to non-conducting before another of said pairs of switches begins to transition from non-conducting to conducting, and said stored values are defined to increase with service life of said multi-level power converter and are defined differently for said low frequency switches and for said high frequency switches.

In some embodiments, said stored values may include specific values or a function for providing temperature specific deadtime values, said switch controller being connected to at least one temperature sensor for measuring a temperature of said switches.

In some embodiments, said multi-level power converter circuit may be a bidirectional multilevel converter circuit. In some embodiments, said controller may adjust said deadtime in a calibration mode by measuring a transition time of said switches.

In some embodiments, said calibration mode may be initiated by a user interface. In some embodiments, said calibration mode may be initiated automatically upon staring the converter.

In some embodiments, said controller may adjust said deadtime of said switches using a predetermined table of deadtimes for lifetime of the switches. In some embodiments, said controller may adjust said deadtime of said switches using a predetermined model for calculating deadtime based on the lifetime of switches. In some embodiments, said controller may adjust said deadtime of the switches a noise feedback of the current. In some embodiments, said noise feedback may be continuous. In some embodiments, wherein said noise feedback may be periodic.

In some embodiments, said multi-level power converter may include at least one high voltage capacitor for storing power at a voltage boosted, a circuit including at least one inductor connected in series with said AC port, a low voltage capacitor, one of two diodes connected between a first AC input terminal and opposed ends of said high voltage capacitor or two high voltage switches connected between a first AC input terminal and opposed ends of said high voltage capacitor, two intermediate low voltage switches connected between said opposed end of said high voltage capacitor and opposed ends of said low voltage capacitor, and two terminal low voltage switches connected between said opposed ends of said low voltage capacitor and a second AC terminal, wherein a DC load can be connected to said opposed ends of said high voltage capacitor; and wherein said controller sensing current and/or voltage in said circuit and connected to a gate input of said two intermediate low voltage switches and said two terminal low voltage power switches, at least one inductor connected in series with said AC port, a low voltage capacitor, one of two diodes connected between a first AC input terminal and opposed ends of said high voltage capacitor or two high voltage switches connected between a first AC input terminal and opposed ends of said high voltage capacitor, two intermediate low voltage switches connected between said opposed end of said high voltage capacitor and opposed ends of said low voltage capacitor, two terminal low voltage switches connected between said opposed ends of said low voltage capacitor and a second AC terminal, wherein a DC load can be connected to said opposed ends of said high voltage capacitor.

In some embodiments, said controller may be operative for causing said rectifier circuit to operate in a boost mode wherein a voltage of said high voltage capacitor is higher than a peak voltage of said AC input, and said two intermediate low voltage power switches and said two terminal low voltage power switches are switched with redundant switching states in response to a measurement of a voltage present at said low voltage capacitor so as to maintain said low voltage capacitor at a predetermined fraction of a desired voltage for said high voltage capacitor and to thus maintain said high voltage capacitor at a desired high voltage, with said rectifier circuit supplying said DC load and absorbing power as a five-level active rectifier with low harmonics on said AC input.

In some embodiments, said battery charging controller interface may further communicate with the electric power storage battery and receives a desired charge current value, and said power converter is further responsive to said desired charge current value to convert power from said AC input to DC at a DC output at a variable current not exceeding said desired charge current value for a DC load.

In some embodiments, the power converter may further include a buck converter circuit for converting DC power from said opposed ends of said high voltage capacitor to a lower DC output voltage set by said charge voltage value.

The present disclosure is further described in the detailed description.

BRIEF DESCRIPTION OF THE DRAWINGS

The system of the present disclosure will be better understood by way of the following detailed description of embodiments of the invention with reference to the appended drawings, in which:

FIG. 1A is a graph that describes some background of power converters, the need for pairs of switches and how their alternation is critical. FIG. 1B is a graph that describes a duty cycle of a pair of alternating switches.

FIG. 1C is a figure from a prior patent showing external circuitry that can determine the ideal state of a variety of switch pairs.

FIG. 3A is a table exemplifying an example switch sequence table.

FIG. 3B is a table exemplifying an example switch dead-time table.

FIG. 6A is a flow diagram of a detailed program in an embodiment where the system includes external circuitry.

DETAILED DESCRIPTION

The present disclosure relates to systems and methods for reducing the dead time in switch alternation in power converters, increasing the efficiency of the power converters. The current disclosure begins by giving more information about converters for the convenience of the reader, then explains in greater detail the problem of unoptimized dead time, and then the current disclosure's solutions to overcome the problem.

Figure 1A:
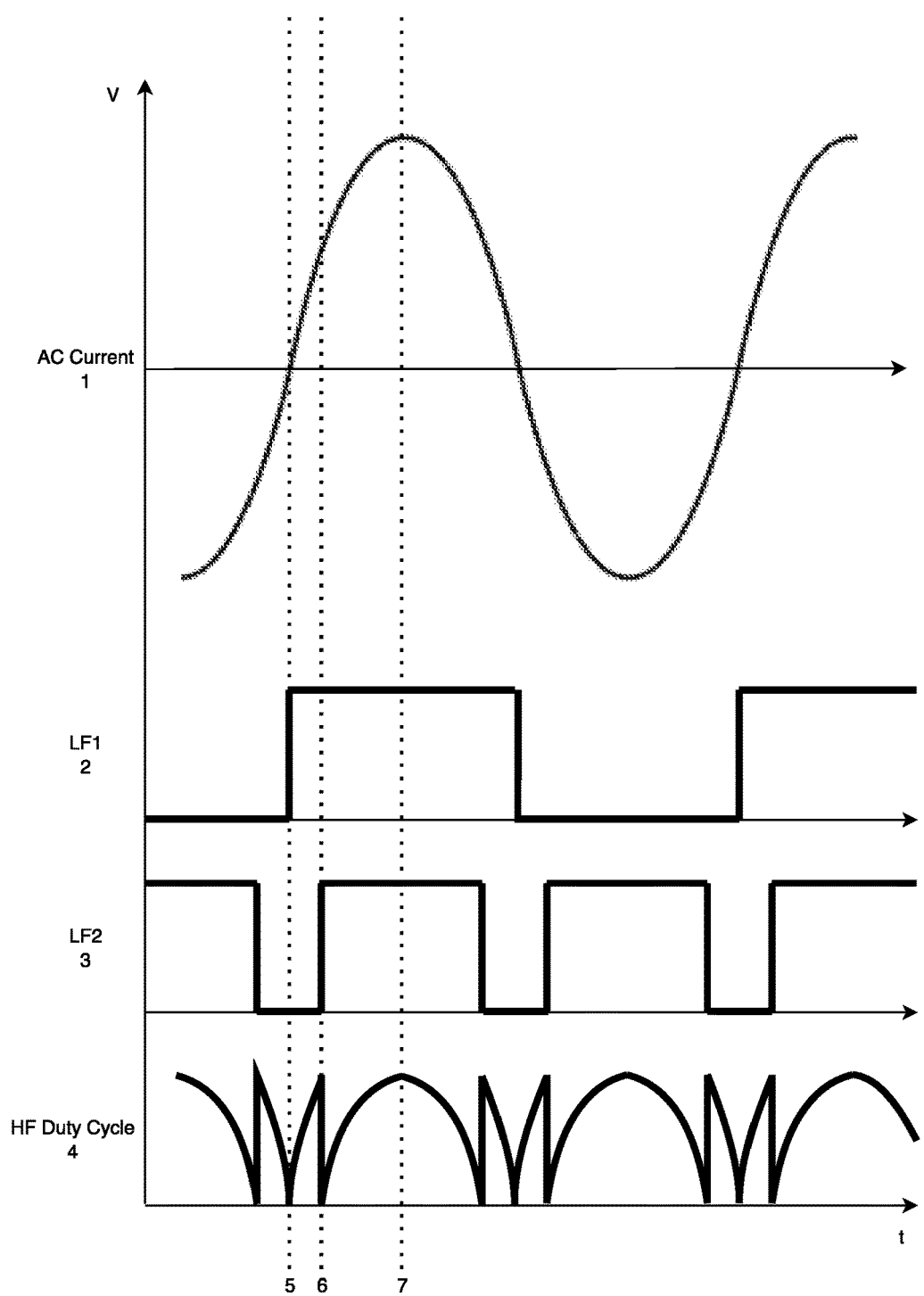
FIGS. 1A-1C are prior art.

FIG. 1A is a graph that describes some background of power converters, the need for pairs of switches and how their alternation is critical. This background is for the benefit of the reader, and should be considered prior art. Power converters convert alternating current (AC) into direct current (DC), or vice versa. The conversion takes many steps. FIG. 1A shows some of the first steps of converting AC into DC. The AC current 1 is shown. Various pairs of switches, such as pairs of low frequency (LF) or high frequency (HF) switches are used to convert the AC current 1 into the HF duty cycle 4. A pair of LF switches, LF1, are able to convert AC current 1 into a positive voltage by switching the direction of current flow when the AC current 1 is negative. The activity of LF1 switches is shown in the graph with LF1 2. A next pair of LF switches, LF2, are activated when the current is above a certain absolute value. Here, the LF2 switches engage when the current is half of its maximum. The activity of LF2 switches is shown in the graph with LF2 3. With the use of various LF switch pairs, the system is able to create a duty cycle 4 for its high frequency switches. One skilled in the art would have the knowledge of the final steps required to convert the HF duty cycle 4 into DC power. Various time points 5, 6 and 7 have been included for ease of visualizing the moments where the pairs of switches are alternated, as well as for ease of visualizing how the HF duty cycle 4 corresponds to a normalized, positive version of the AC current 1.

Figure 1B:
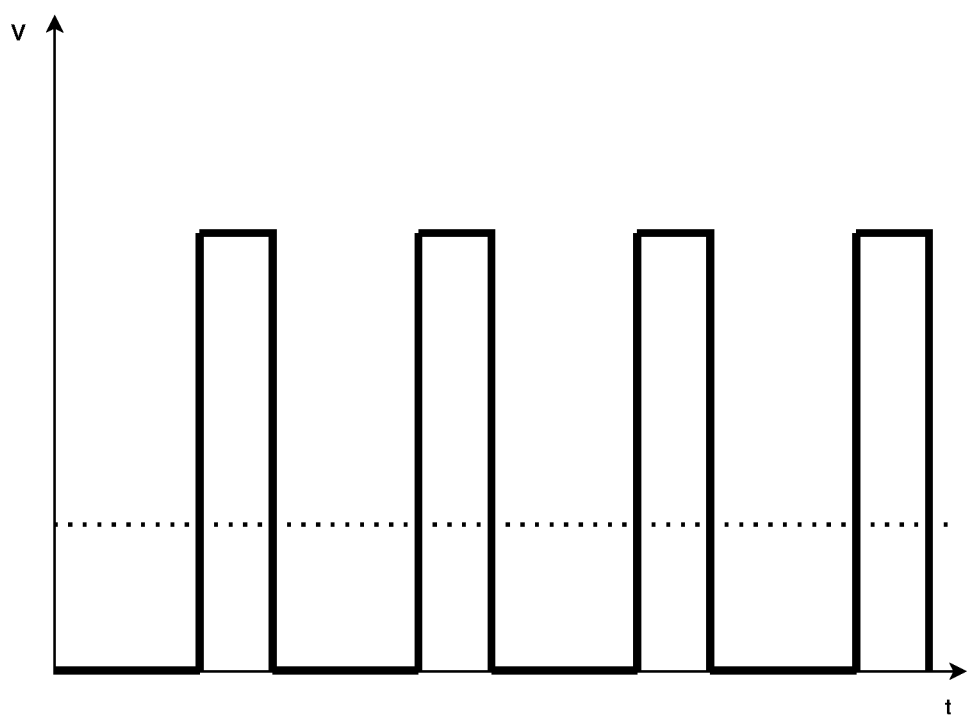

FIG. 1B is a graph that describes a duty cycle of a pair of alternating switches. Similarly to FIG. 1A, this background is for the benefit of the reader, and should be considered prior art. Pairs of HF switches control the direction of current. The direction of current is an all or nothing measurement, with an output of 0 or 1. Sometimes, an intermediate value is needed. To have an output that is not 0 or 1, the system will modulate between 0 and 1 within a period such that the average value of output throughout one period is the desired intermediate value. The fraction of time in one period where the output is 1 is called the duty cycle. In the example of FIG. 1B, the desired output value is 0.33 of the output value. To achieve this intermediate value, the switches will allow current in one direction for ⅓ of the time. Over time, the system will thus receive an average of 0.33, shown by the dotted line. Because the period is very short, sometimes as low as a ten thousandth of a second, and the frequency of change is high, the measurable output is effectively 0.33.

For additional information about power converters, as well as additional information about how pairs of switches are used to achieve power conversion, see a prior patent by the applicant having serial number PCT/CA2018/051291 (publication number WO/2019/071359).

Figure 1C:
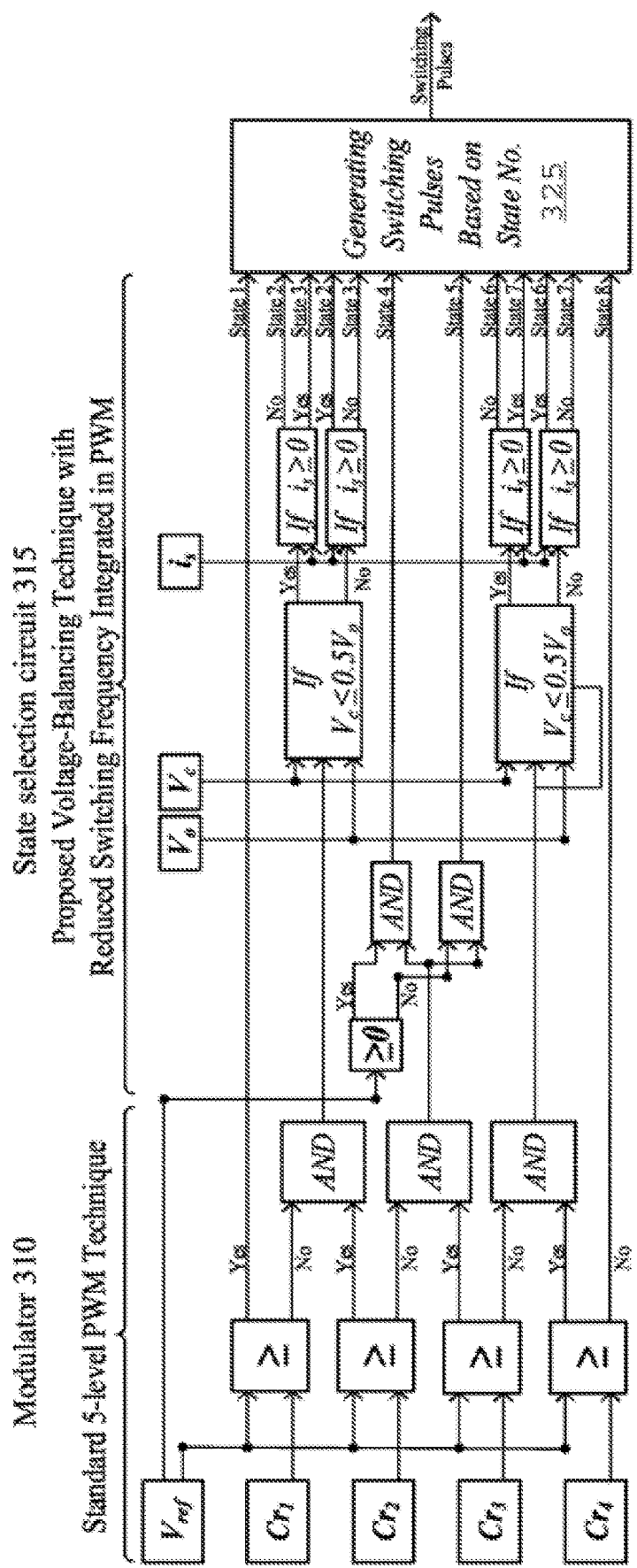

FIG. 1C is a figure from a prior patent (PCT/CA2018/051291) showing external circuitry that can determine the ideal state of a variety of switch pairs. The figure is included for the benefit of the reader and will not be described in great detail in this disclosure. What is important for the present disclosure is that the external circuitry is capable of determining the ideal state of a variety of switch pairs using voltage and current information about the input/output power of the power converter. Such external circuitry may be incorporated in the present system to determine the ideal state of a variety of switch pairs.

Figure 2:
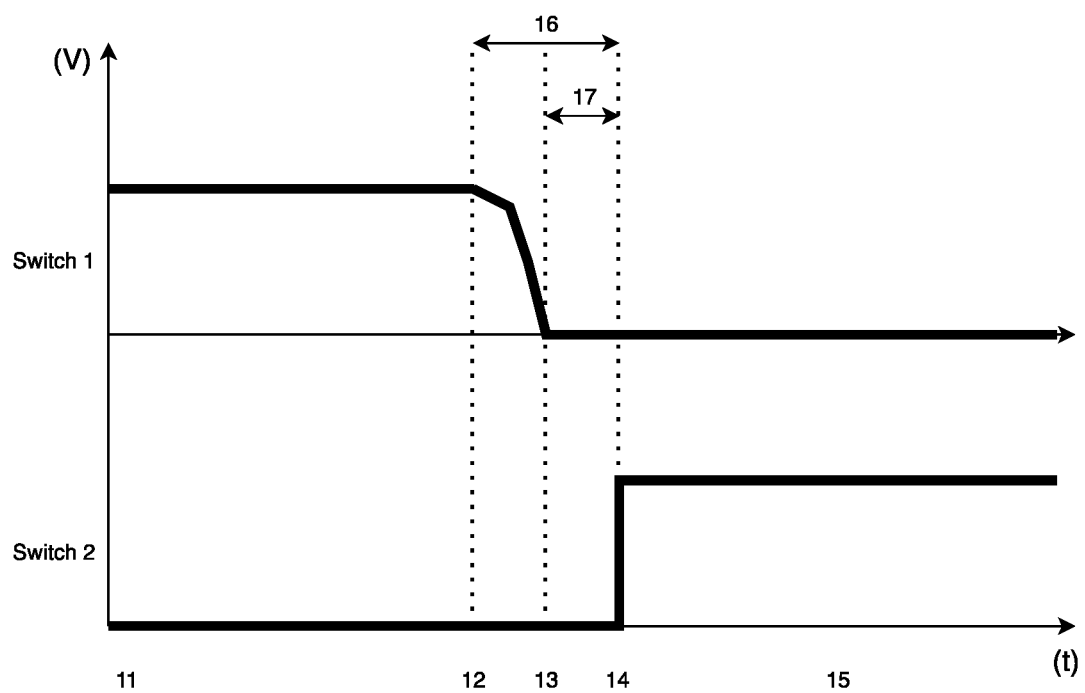
FIG. 2 is a graph exemplifying the problem of unoptimized dead time.

FIG. 2 is a graph exemplifying the problem of unoptimized dead time in alternating switches. The upper portion of the graph is showing the current flowing through the first of a pair of switches, and the lower portion of the gram is showing the current flowing through the second of a pair of switches. At time point 11, the first switch is on and the second switch is off. At time point 12, the system receives an instruction to alternate to the other switch. The first switch turns off at time point 12. However, the second switch cannot be turned on yet due to the residual energy in the system, shown by the gradually decreasing current in the upper portion of the graph between time points 12 and 13. If the second switch was turned on at time point 12, the system would short circuit. Thus, the system waits for the energy to dissipate. An unoptimized system will usually give a certain margin for error to guarantee that there is no risk of a short circuit, so they will wait a certain amount of time more than needed. This unoptimized dead time is represented by 16. 17 represents the proportion of unoptimized dead time that is wasted time, i.e., time where the system is not performing any function. It is the object of the current invention to minimize, to the point of elimination, wasted time 17 to reduce dead time 16 to be as short as possible while still allowing the residual energy to dissipate.

For clarity, optimized dead time represents the minimum amount of time required to wait after one switch is turned off to turn on its complimentary switch without shorting the circuit. A shorter/smaller optimized dead time is desirable, as it means the system will spend less time in an inactive state.

A number of variables (sometimes referred to as parameters) can affect the optimized dead time. Different types of switches, or similar types of switches of different make, may have varying levels of efficiency in terms of their switching speed or amount of residual energy that they leave behind in the system. A faster switch has a shorter optimized dead time. A switch that leaves less residual energy in the system would also have a shorter optimized dead time.

Another variable that affects the optimized dead time is switch age. Switches experience wear and tear throughout their lifetime as they are used. This may reduce the speed of switching or increase the amount of residual energy left in the system after a switch. Thus, the optimized dead time increases with switch age. This is a difficult variable to account for, as it may change throughout the usage of a system. A system that cannot change its dead time over time would be forced to use an unoptimized dead time.

Another variable that affects the optimized dead time is switch temperature. Temperature affects the speed of switching and the amount of residual energy left in the system after switching. The optimized dead time increases with temperature. Similarly to switch age, this variable might change throughout the usage of a system. A system that cannot change its dead time over time would be forced to use an unoptimized dead time.

The current system may use these variables to determine, in real time throughout the usage of the system, the optimized dead time for each of the pairs of switches of the system. Essentially, the system uses software to determine which switches must be altered at any given time, and when certain switches are altered, the system uses software to determine the optimized dead times for the switches that were switched.

FIG. 3A is a table exemplifying an example switch sequence table 63. As previously stated, a power converter may control the state of a plurality of switches in order to properly convert one type of current to another. This table allows the system to know the states that all the switches should be in at a given time. This is extremely important when converting to or from alternating current (AC), where the input/output of the power converter must be in phase with the wave of the AC. In an exemplary embodiment, the switch sequence table contains an index and the state of every switch of a power converter for each index. The index represents the phase of an AC sine wave. Index 0 represents the beginning of the sine wave, and the max index number (here, 167) represents the end of the sine wave. Here, where the max index number is 167, the middle of the sine wave would be at around index 83. Thus, using a switch sequence table, the MC or MP can instruct switches to turn on and off to produce current in phase with an AC sine wave. A switch sequence table may have an index column (here, 0-167) and one or more ideal switch state columns, which describe the state that switches should be in for a given index.

In order to be in phase with the AC sine wave, the system may require a calibration step to know at which index to begin from. For example, if the system is connected to an AC input or output at a given time, the MC or MP may receive information from one or more voltage sensors about the phase of AC and determine which index corresponds to the phase of the current.

In some embodiments, the max index number may change. In the exemplary embodiment, the max index number was chosen because the frequency of the HF switches is around 10 000 Hz, and the cycles per second of an AC is commonly 60 cycles per second. This means that each HF switch can alternate around 10 000 Hz/60 cycles per second, or around 167 switches per cycle. Because, in the exemplary embodiment, the power converter is a five-level converter, it is desirable to have a number of indexes that is a multiple of 4. The closest multiple of 4 to 167 switches per cycle is 168 switches per cycle. Thus, the max index number is 167 (for a total of 168 index states because the index starts from 0). In this example, the duration of each index is 168 states per cycle, where each cycle is 1/60 seconds, so around 99.21 microseconds ($9.921 \times 10^{-5}$ seconds).

Note that when one switch of a pair is on, the other switch of the pair is off (e.g., HF1 is off when HF2 is on). Note that the LF switches alternate less rapidly than the HF switches.

In some embodiments, the number of switches or switch types encompassed in the switch sequence table may change.

In some embodiments, one system may have more than one switch sequence table 63. This may allow the system to have the capability of converting more than one kind of input current to various output currents.

FIG. 3B is a table exemplifying an example switch dead time table 60. In the preferred embodiment, the dead time column is a set of pre-calculated dead times that represent optimized dead times in function of the preceding column variables. This allows for a system to know the optimized dead time depending on a number of parameters including type of switch, the switch's age, the switch's temperature and the status of the switch. This table is specific to each switch type and make. A dead time table may have an optimized dead time column, showing the optimized dead time, and one or more parameter columns that determine the conditions for that optimized dead time.

In some embodiments, the table may contain more variables that allow the system to precisely know the dead time.

In some embodiments, the organization may be different. For example, the exemplary switch dead time table is organized first by switch age and then by temperature and other variables. In other embodiments, the table may be organized first by temperature and then by switch age and other variables.

In some embodiments, a switch dead time table may contain information about many types or makes of switches, such that the information of the various switch types and makes in one system are integrated into one file.

Figure 4A:
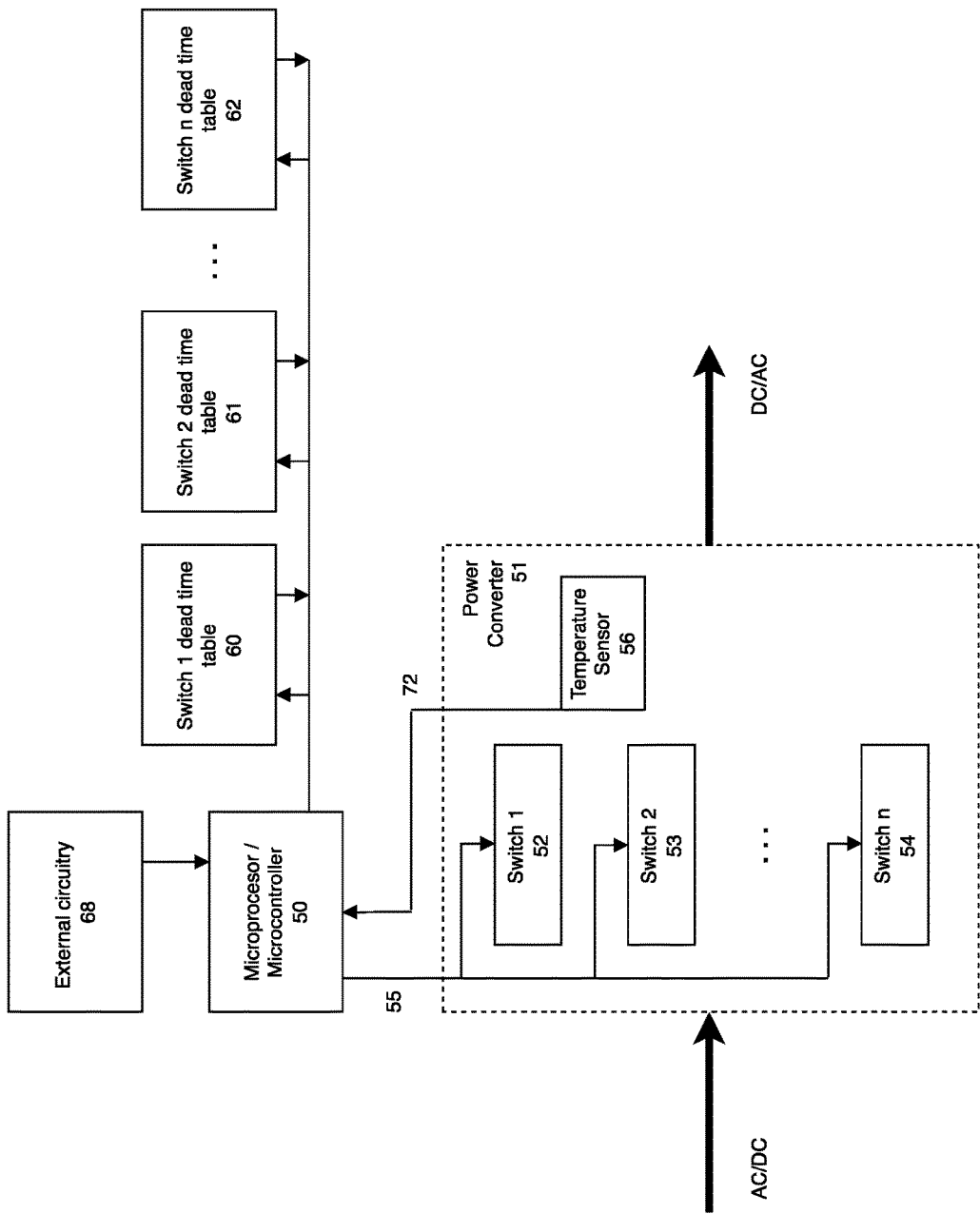
FIG. 4A is a box diagram of one embodiment of the current disclosure using external circuitry.

FIG. 4A is a box diagram of one embodiment of the current disclosure using external circuitry. A MC or MP 50 may be configured to receive signals from external circuitry 68 which can determine the ideal state for each switch pair to be in. The external circuitry 68 may be connected to voltage or current sensors that are themselves connected to the input and output power of the converter. The MC or MP 50 may also be configured to access, via memory, one or more switch dead time tables 60-62, which contain information about optimized dead times depending on certain variables. The MC or MP may also be configured to receive temperature information 72 from a temperature sensor 56 housed within the power converter 51. When the MC or MP 50 receives a signal from external circuitry 68 to change the state of a switch pair, the MC or MP 50 may send commands 55 to turn on or off various switches 52-54 within the PUC5 unit. A PUC5 multilevel power conversion circuit suitable for the present application is disclosed in Applicant's U.S. Pat. No. 10,759,287, the contents of which are hereby incorporated by reference.

In some embodiments, the MC or MP 50, tables 60-62 and sensors 64-65 may be integrated within the power converter.

In some embodiments, other sensors may be added to the system to send information about the switches or power converter to the MC or MP.

In some embodiments, one MC or MP may be configured to control switches from one or more power converters at the same time.

Figure 4B:
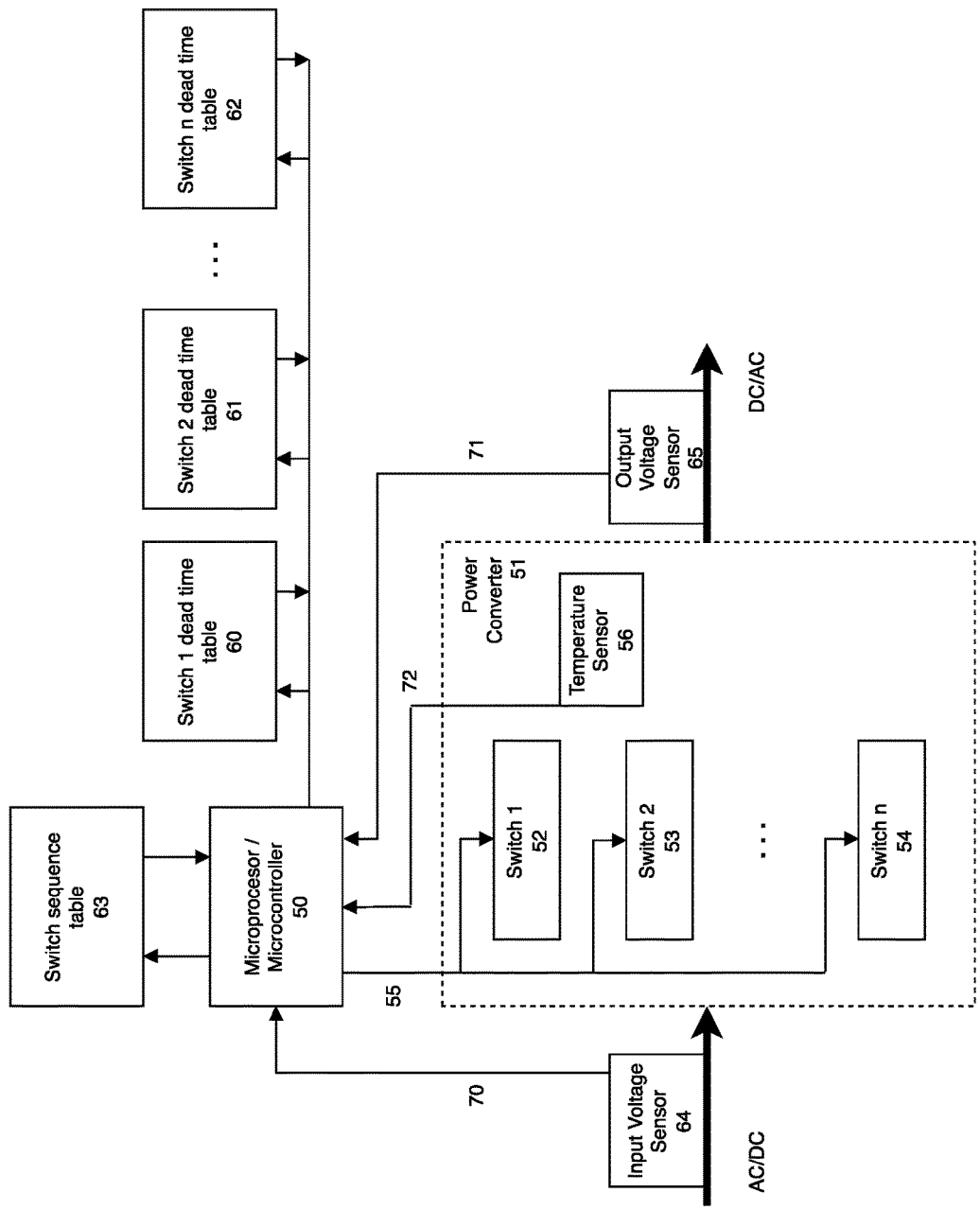
FIG. 4B is a box diagram one embodiment of the current disclosure using a switch sequence table.

FIG. 4B is a box diagram one embodiment of the current disclosure using a switch sequence table. A MC or MP 50 may be connected to an input voltage sensor 64, which may in turn be connected to the input current, and an output voltage sensor 65 which may in turn be connected to an output current. The input voltage sensor 64 may send voltage information 70 to the MC or MP 50 about the input current. The output voltage sensor 65 may send voltage information 71 to the MC or MP 50 about the output current. The MC or MP may also be configured to access, via memory, a switch sequence table 63, which indicates which switches should be on or off at a given time, and one or more switch dead time tables 60-62, which contain information about optimized dead times depending on certain variables. The switch sequence table 63 may be accessed using an index, calculated by the MC or MP 50 using the voltage information 71. The MC or MP may also be configured to receive temperature information 72 from a temperature sensor 56 housed within the power converter 51. The MC or MP may then use all the information at its disposal to send commands 55 to turn on or off various switches 52-54 within the PUC5 unit. A PUC5 multilevel power conversion circuit suitable for the present application is disclosed in Applicant's U.S. Pat. No. 10,759,287, the contents of which are hereby incorporated by reference.

In some embodiments, the MC or MP 50, tables 60-62 and sensors 64-65 may be integrated within the power converter.

In some embodiments, other sensors may be added to the system to send information about the switches or power converter to the MC or MP.

In some embodiments, one MC or MP may be configured to control switches from one or more power converters at the same time.

Figure 5:
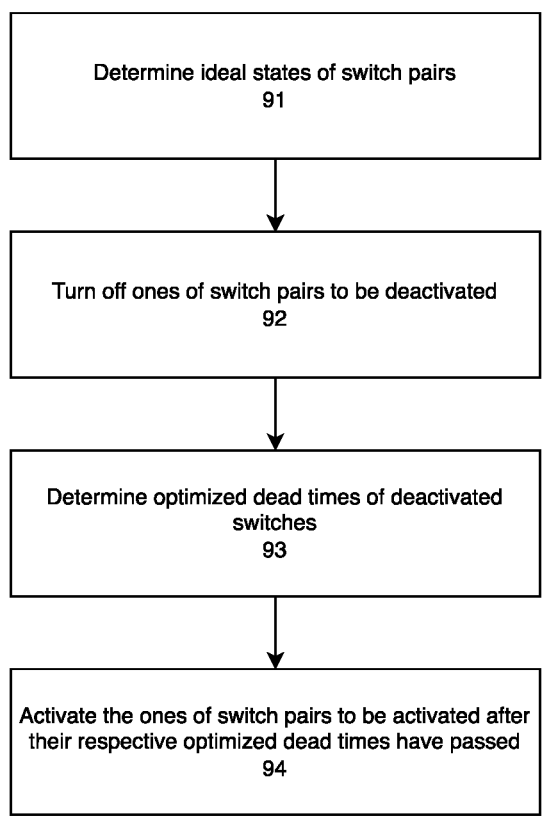
FIG. 5 is a flow diagram describing the overall logic of the main program of the microcontroller.

FIG. 5 is a flow diagram describing the overall logic of the main program of the microcontroller or microprocessor. In this exemplary embodiment, the program may begin by determining the ideal states of switch pairs that the MC or MP is connected to 91. The program may then turn off ones of switch pairs to be deactivated 92. By 'ones of switch pairs to be deactivated' is meant the switch of each switch pair that is being turned off before the other of the switch pair can be turned on. The program may then determine optimized dead times of the deactivated switches 93. The program may then activate the ones of switch pairs to be activated after their respective optimized dead times have passed 94.

In some embodiments, the program may include a calibration step. The calibration step may include receiving information from one or more voltage sensors about the AC that is connected to the power converter. This may allow the MC or MP to determine the phase of the AC cycle and thus accurately determine the ideal state of the plurality of switch pairs.

In some embodiments, the calibration step may include receiving information about the individual switches of the power converter. This may allow the system to keep track of the 'status' of each switch, where the status could refer to the lifetime of each switch, the amount of time a switch requires to discharge residual energy in the system or the wear and tear of the switch. In some embodiments, the calibration step may alert the user of one or more switches needing replacement. Keeping track of the lifetime of the switch, or its ability to perform switching, would allow the MC or MP to better estimate optimized dead times. Such a calibration step may also involve measuring the dead times of each switch.

In some embodiments, determining the ideal switch states 91 may be accomplished by external circuitry. This external circuitry may be configured to receive information such as voltage or current information and determine the ideal state of various pairs of switches. The external circuitry may then transmit the information about ideal states to the microcontroller or microprocessor.

In some embodiments, determining the ideal switch states 91 may be accomplished by reference to a switch sequence table. Such a table may include an index column and one or more ideal switch state columns describing the ideal state of switches based on the index, which represents a phase in the AC cycle. In some embodiments, the system may use an index number to simply read in the table the ideal state of a plurality of switches at that given time.

In some embodiments, determining the ideal switch states 91 may be accomplished by performing a calculation which can determine, using information (such as, but not limited to, phase of AC) about the currents connected to the power converter, the ideal state of a plurality of switches. In some embodiments, the results of such a calculation may be stored in memory for later retrieval. In some embodiments, the system may perform such a calculation at the beginning of usage, store all the calculated ideal switch states in memory, and merely refer back to them every AC cycle.

In some embodiments, determining optimized dead times of switches 93 may be accomplished by searching, using parameters such as those previously mentioned, the dead time table of the switch in question, or, if the dead time tables of various switches are integrated into one dead time table, searching the integrated dead time table for the information about the dead time of the switch in question.

In some embodiments, determining optimized dead times of switches 93 may be accomplished by performing a calculation which can determine, using information (such as the parameters previously mentioned) about the switches, the optimized dead time of each of the switches. In some embodiments, the results of such a calculation may be stored in memory for later retrieval. In some embodiments, the system may perform such a calculation at the beginning of usage, store all the calculated optimized dead times in memory, and merely refer back to them as required.

In some embodiments, the activation or deactivation of switches described in steps 92 and 94 may be accomplished through intermediary circuits, such as circuits that create a certain delay or that relay messages to other circuits. The system may be configured to take into account the effect of sending signals via such intermediary circuits.

FIG. 6A is a flow diagram of a detailed program in an embodiment where the system includes external circuitry. In the exemplary embodiment, the MC or MP may first receive a signal from external circuitry informing the MC or MP to change the state of a pair of switches 95. The MC or MP may then deactivate the switch of the pair to be deactivated 96. The MC or MP may then obtain the optimized dead time for the deactivated switch 97, which may be accomplished through looking for an optimized dead time in a dead time table or through calculating the optimized dead time. The MC or MP may then wait for the duration of the optimized dead time 98 to allow the residual energy in the system to dissipate. The MC or MP may then activate the switch of the pair to be activated 99, thus changing the state of the switch pair.

It is understood that steps 95-99 may be performed in parallel for multiple pairs of switches, so that the MC or MP is not waiting the duration of the dead time 98 to be able to receive new signals from external circuitry 95. In an ideal embodiment, any signal to deactivate a switch is immediately passed through to deactivate the switch, and the MC or MP keeps track of how long to wait for each optimized dead time in a parallel fashion.

In some embodiments, the logic of the main program of the MC or MP may be implemented in various ways. For example, to allow for the parallel features described above, the program may receive a signal to change the state of a switch pair, immediately pass through a signal to deactivate the switch to be deactivated, and then create a temporary countdown timer in memory equal to the optimized dead time of the deactivated switch. If multiple switch pairs need to change states in a short amount of time, the memory may be populated with many countdown timers at a given moment, each independent of one another. When a countdown timer reaches 0, the switch to be activated may be activated.

Figure 6B:
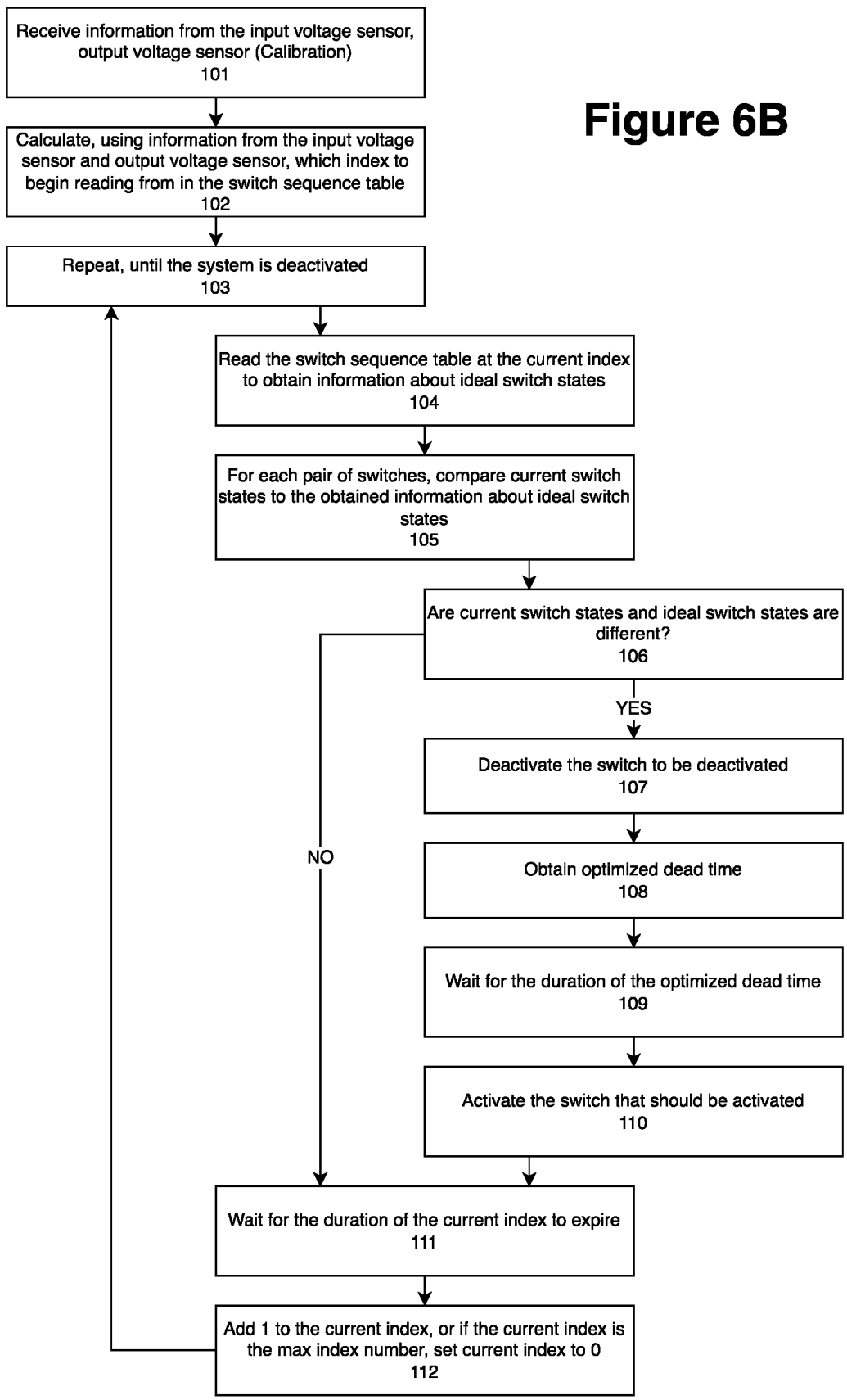
FIG. 6B is a flow diagram of a detailed program in an embodiment where the system includes a switch sequence table.

FIG. 6B is a flow diagram of a detailed program in an embodiment where the system includes a switch sequence table. In the exemplary embodiment, the MC or MP may first receive information from an input voltage sensor, output voltage sensor and temperature sensor 101. The MC or MP may then calculate, using information from the input voltage sensor and output voltage sensor, which index to begin reading from in the switch sequence table 102. Essentially, this amounts to determining the phase of the AC sine wave and starting from the index corresponding to that phase. This would allow the MC or MP to be in sync with the sine wave of AC. The MC or MP may then repeat, until the system is deactivated 103, a logic loop. The logic loop may first involve the MC or MP reading the switch sequence table at the current index to obtain information about the ideal switch states 104. The logic loop may then involve the MC or MP comparing, for each pair of switches in the power converter, the current switch states (on vs off) to the ideal switch states determined by the switch sequence table 105. The logic loop may then involve the MC or MP determining whether the current switch states are different than the ideal switch states 106. If yes, the logic loop may then involve the MC or MP deactivating the switch of the pair to be deactivated 107. The logic loop may then involve the MC or MP obtaining an optimized dead time. The logic loop may then involve the MC or MP waiting until the duration of the optimized dead time is over 109. The logic loop may then involve the MC or MP activating the switch that is to be activated 110. The logic loop may then involve the MC or MP waiting for the duration of the current index to expire 111. In the exemplary embodiment with 168 indexes per cycle, with 60 cycles per second, the total duration of the current index is around $9.921 \times 10^{-5}$ seconds. If the current switch states were not different from the ideal switch states at step 106, the logic loop would skip steps 107-110 and jump straight to step 111. In the final step of the logic loop, the MC or MP may ad 1 to the current index, to allow the program to cycle to the next index, or if the current index is the max index number (in our example, 167) then the current index would be set to 0 so that the cycle can repeat from the first index.

It is understood that steps 106-110 may be performed in parallel for each pair of switches, so that the loop is not waiting the duration of the dead time 109 to be able to evaluate the current state vs ideal state of the next pair of switches. In an ideal embodiment, all switches that need to be turned off are turned off, and then the respective dead times are waited for each switch to be turned on.

In some embodiments, the logic loop may further include another variable that keeps track of the total number of indexes that the system has cycled through, for the purposes of keeping track of the system or switch lifetime.

In some embodiments, the logic of the main program of the MC or MP may be implemented in various ways. In some other embodiments, the program may be separated into various independent units, such as a unit to manage the sequence index, a unit to determine the dead time of each pair of switches, and a unit to send the commands to the various switches.

In some embodiments, the system may include more than one way of determining ideal states of switches or optimized dead times. For example, it may be beneficial to have both information from external circuitry as well as a switch sequence table. The MC or MP may be configured to compare the information about ideal switch states from multiple sources to ensure that they are the same or are similar. This may allow for a reduction in error in situations where one source of ideal switch state information has a glitch or error.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. A system for optimizing the dead time of various pairs of switches in a power converter, the system comprising:
   a. a memory;
   b. a microcontroller or microprocessor, connected to said memory and to at least one switch pair, said microcontroller or microprocessor for executing a program stored in said memory to:
      i. determine ideal states for at least one switch pair;
      ii. turn off ones of said at least one switch pair to be deactivated;

iii. determine an optimized dead time of one or more switches to be activated; and iv. turn on ones of said at least one switch pair to be activated after the optimized dead time has passed.

2. The system of claim 1, further comprising external circuitry capable of determining the ideal states of switches, wherein determining the ideal states for at least one switch pair involves receiving a signal from the external circuitry informing the microcontroller or microprocessor of the state that the at least one pair of switches should be in.

3. The system of claim 1, further comprising one or more switch sequence tables stored in said memory, wherein said one or more switch sequence tables contain an index column and one or more ideal switch state columns.

4. The system of claim 3, wherein the program executed by the microcontroller or microprocessor is further configured to, prior to step (i), receive information from one or more voltage/current sensors about a current connected to the power converter, use said information to determine the phase of said current, and determine a current index value reflective of said phase.

5. The system of claim 4, wherein determining the ideal states for at least one switch pair involves accessing said switch sequence tables during step, using the current index value to read in the table the ideal states for one or more switches and updating the current index after a predetermined amount of time has passed.

6. The system of claim 1, wherein the microcontroller or microprocessor in step (i) determines the ideal state of switches of one or more switches by performing a calculation.

7. The system of claim 6, wherein said calculation involves receiving information from one or more voltage/current sensors about a current connected to the power converter, using said information to determine the phase of said current, and determining what the ideal state of each switch pair should be depending on said phase.

8. The system of claim 7, wherein the calculated ideal switch states are stored in said memory so that the optimized dead time calculation need not be performed every cycle of current.

9. The system of claim 1, wherein the microcontroller or microprocessor is connected to at least one high frequency switch pair and at least one low frequency switch pairs.

10. The system of claim 1, further comprising one or more dead time tables stored in said memory, wherein said dead time tables contain an optimized dead time column and one or more parameter columns.

11. The system of claim 10, wherein the microcontroller or microprocessor is further configured to access said dead time tables during step (iii) and use one or more parameters to read in the table the optimized dead time of one or more switches to determine an optimized dead time.

12. The system of claim 11, wherein said parameters comprise the switch type or make, the temperature of the switch determined by one or more temperature sensors connected to the microcontroller or microprocessor, the age of the switch and the status of the switch, determined by evaluating the status of switches during a calibration step.

13. The system of claim 1, wherein the microcontroller or microprocessor in step (iii) determines the optimized dead time of one or more switches by performing a calculation using parameters about the switches.

14. The system of claim 13, wherein said parameters comprise the switch type or make, the temperature of the sensor determined by one or more temperature sensors connected to the microcontroller or microprocessor, the age of the switch and the status of the switch, determined by evaluating the status of switches during a calibration step.

15. The system of claim 14, wherein the calculated optimized dead time is stored in said memory so that the optimized dead time calculation need not be performed every switch alternation.

16. A multi-level power converter comprising:
an AC port;
a DC port;
a multi-level power converter circuit connected to said AC port and said DC port having a plurality of oppositely gated pairs of power switches including low frequency switches and high frequency switches;
a switch controller of the type having digital logic or a processor responsive to a reference signal that generates gate signals for said low frequency switches and for said high frequency switches;
wherein said switch controller is responsive to stored values defining a deadtime in said pairs of switches during which one of said pairs of switches has time to transition from conducting to non-conducting before another of said pairs of switches begins to transition from non-conducting to conducting; and
said stored values are defined to increase with service life of said multi-level power converter and are defined differently for said low frequency switches and for said high frequency switches.

17. The power converter in claim 16, wherein said stored values comprises specific values or a function for providing temperature specific deadtime values, said switch controller being connected to at least one temperature sensor for measuring a temperature of said switches.

18. The power converter in claim 16, wherein said controller adjusts said deadtime in a calibration mode by measuring a transition time of said switches.

19. The power converter in claim 16, wherein said controller adjusts said deadtime of said switches using a predetermined table of deadtimes for lifetime of the switches.

20. The power converter in claim 16, wherein said controller adjusts said deadtime of said switches using a predetermined model for calculating deadtime based on the lifetime of switches.

* * * * *